United States Patent
Ishiguro et al.

(10) Patent No.: US 10,831,058 B2
(45) Date of Patent: Nov. 10, 2020

(54) DECORATIVE SHEET, OPTICAL DEVICE, AND IMAGE DISPLAY DEVICE

(71) Applicant: FUJIFILM Corporation, Tokyo (JP)

(72) Inventors: Makoto Ishiguro, Minami-Ashigara (JP); Nobuhiko Ichihara, Minami-Ashigara (JP); Michio Nagai, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/678,202

(22) Filed: Nov. 8, 2019

(65) Prior Publication Data

US 2020/0073173 A1  Mar. 5, 2020

Related U.S. Application Data

(63) Continuation of application No. PCT/JP2018/019379, filed on May 18, 2018.

(30) Foreign Application Priority Data

May 19, 2017 (JP) .................................. 2017-099968

(51) Int. Cl.
G02F 1/1335 (2006.01)
G02B 5/30 (2006.01)

(52) U.S. Cl.
CPC ..... *G02F 1/133533* (2013.01); *G02B 5/3041* (2013.01); *G02F 1/133536* (2013.01);
(Continued)

(58) Field of Classification Search
None
See application file for complete search history.

(56) References Cited

U.S. PATENT DOCUMENTS 6,147,734 A * 11/2000 Kashima ........... G02F 1/133528
349/113
7,535,526 B1   5/2009 Kim
(Continued)

FOREIGN PATENT DOCUMENTS

JP   5-161039 A    6/1993
JP   10-197722 A   7/1998
(Continued)

OTHER PUBLICATIONS

English translation of JP-2007065314-A, Title: Circularly Polarized Light Separating Sheet, Author: Goto, Nobuyuki; Mitsuhata, Kazuhisa; Haraguchi, Manabu; Kawabata, Yasunari; Date of publication: Mar. 15, 2007 (Year: 2007).*

(Continued)

*Primary Examiner* — Shan Liu
(74) *Attorney, Agent, or Firm* — Birch, Stewart, Kolasch & Birch, LLP

(57) ABSTRACT

Provided are a decorative sheet for making the element using external light, for example, a camera or a sensor inconspicuous to an observer and an optical device and an image display device that include the above-described decorative sheet. The decorative sheet including a circularly polarized light reflecting layer, a λ/4 plate A, a linear polarizer, and a λ/4 plate B in this order, in which the circularly polarized light reflecting layer includes one or more cholesteric liquid crystal layers having wavelength selective reflecting properties, in a case where an integral reflectivity at a wavelength λ nm is represented by I-R(λ), I-R(630), I-R(550), and I-R(450) of the circularly polarized light reflecting layer are 30% or higher, and an angle between a slow axis of the λ/4 plate A and an absorption axis of the linear polarizer and an angle between a slow axis of (Continued)

the λ/4 plate B and the absorption axis of the linear polarizer are 45°±10°, respectively.

17 Claims, 1 Drawing Sheet

(52) U.S. Cl.
CPC ............ *G02F 2001/133541* (2013.01); *G02F 2001/133543* (2013.01)

(56) References Cited

U.S. PATENT DOCUMENTS

| | | | | |
|---|---|---|---|---|
| 2005/0185117 | A1* | 8/2005 | Kashima | G02F 1/1393 349/97 |
| 2008/0043187 | A1* | 2/2008 | Mimura | G09G 3/3648 349/114 |
| 2011/0222155 | A1* | 9/2011 | Sakai | G02F 1/13363 359/489.07 |
| 2015/0043070 | A1* | 2/2015 | Kitagawa | G02B 5/305 359/487.02 |
| 2017/0003429 | A1* | 1/2017 | Kanatani | G02F 1/133528 |
| 2018/0164481 | A1 | 6/2018 | Atsumi et al. | |

FOREIGN PATENT DOCUMENTS

| | | |
|---|---|---|
| JP | 11-326897 A | 11/1999 |
| JP | 2000-284127 A | 10/2000 |
| JP | 2002-258048 A | 9/2002 |
| JP | 2007065314 A * | 3/2007 |
| JP | 2008-46329 A | 2/2008 |
| JP | 2014-219551 A | 11/2014 |
| WO | WO 2017-033468 A | 3/2017 |

OTHER PUBLICATIONS

International Preliminary Report on Patentability, dated May 22, 2019, for International Application No. PCT/JP2018/019379, with an English Translation.
International Search Report, dated Aug. 21, 2018, for International Application No. PCT/JP2018/019379, with an English translation.

* cited by examiner

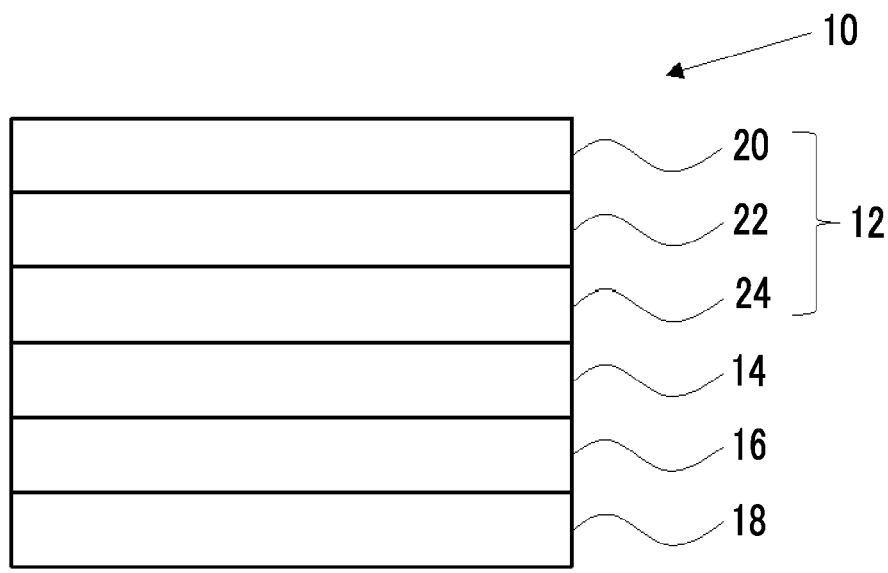

DECORATIVE SHEET, OPTICAL DEVICE, AND IMAGE DISPLAY DEVICE

CROSS-REFERENCE TO RELATED APPLICATIONS

This application is a Continuation of PCT International Application No. PCT/JP2018/019379 filed on May 18, 2018, which claims priority under 35 U.S.C. § 119(a) to Japanese Patent Application No. 2017-099968 filed on May 19, 2017. The above application is hereby expressly incorporated by reference, in its entirety, into the present application.

BACKGROUND OF THE INVENTION

1. Field of the Invention

The present invention relates to a decorative sheet, an optical device, and an image display device.

2. Description of the Related Art

Recently, an element using external light, for example, a camera or a sensor has been mounted on a device such as a mobile personal computer, a smartphone, or a tablet. In addition, it is expected that the kind and number of devices on which the element using external light is mounted will increase due to improvement of a technique such as personal authentication or viewpoint tracking using a camera or a sensor.

Various techniques relating to the element using external light have been proposed. For example, JP1993-161039A (JP-H05-161039A) discloses a technique of disposing a half mirror on a front surface of a surveillance camera such that the surveillance camera is inconspicuous to a visual recognition target.

SUMMARY OF THE INVENTION

Recently, a user has recognized the element such as a camera mounted on the device as "camera", and a sense of unity of the design may deteriorate.

In JP1993-161039A (JP-H05-161039A), the external appearance of the half mirror portion looks like a mirror. Therefore, there is a problem in that it is difficult to apply various designs to the half mirror portion. That is, a technique of making the element using external light such as a camera or a sensor inconspicuous to an observer with a method other than that described in JP1993-161039A (JP-H05-161039A) has been desired.

The present invention has been made in consideration of the above-described circumstances, and an object thereof is to provide a decorative sheet for making the element using external light, for example, a camera or a sensor inconspicuous to an observer.

In addition, another object of the present invention is to provide an optical device and an image display device that include the above-described decorative sheet.

As a result of thorough investigation, the present inventors found that the objects can be achieved by the following configurations.

(1) A decorative sheet comprising a circularly polarized light reflecting layer, a λ/4 plate A, a linear polarizer, and a λ/4 plate B in this order,
in which the circularly polarized light reflecting layer includes one or more cholesteric liquid crystal layers having wavelength selective reflecting properties,
in a case where an integral reflectivity at a wavelength λ nm is represented by I-R(λ),
I-R(630), I-R(550), and I-R(450) of the circularly polarized light reflecting layer are 30% or higher, and
an angle between a slow axis of the λ/4 plate A and an absorption axis of the linear polarizer and an angle between a slow axis of the λ/4 plate B and the absorption axis of the linear polarizer are 45°±10°, respectively.

(2) The decorative sheet according to (1),
in which in a case where a specular reflectivity at a wavelength λ nm is represented by S-R(λ),
S-R(630), S-R(550), and S-R(450) of the circularly polarized light reflecting layer are 30% or lower.

(3) The decorative sheet according to (1) or (2),
in which the circularly polarized light reflecting layer satisfies Expressions (A1) to (C1) described below.

(4) The decorative sheet according to (3),
in which the circularly polarized light reflecting layer satisfies Expressions (A2) to (C2) described below.

(5) The decorative sheet according to any one of (1) to (4),
in which the circularly polarized light reflecting layer includes a plurality of cholesteric liquid crystal layers having different selective reflection wavelengths, and
the selective reflection wavelengths of the plurality of cholesteric liquid crystal layers decrease in order from the linear polarizer side.

(6) The decorative sheet according to any one of (1) to (5),
in which in a case where an integral reflectivity at a wavelength λ nm is represented by I-R(λ),
I-R(750) of the circularly polarized light reflecting layer is 30% or higher.

(7) An optical device comprising:
the decorative sheet according to any one of (1) to (6); and
an element using light transmitted through the decorative sheet.

(8) The optical device according to (7),
in which the decorative sheet according to any one of (1) to (6) is disposed on a surface of the element using light transmitted through the decorative sheet.

(9) The optical device according to (7) or (8),
in which the element using light transmitted through the decorative sheet is an image pickup element.

(10) An image display device comprising:
the decorative sheet according to any one of (1) to (6); and
an image display element.

According to the present invention, a decorative sheet for making the element using external light, for example, a camera or a sensor inconspicuous to an observer can be provided.

In addition, according to the present invention, an optical device and an image display device that include the above-described decorative sheet can be provided.

BRIEF DESCRIPTION OF THE DRAWINGS

FIG. 1 is a schematic cross-sectional view illustrating one embodiment of a decorative sheet according to the present invention.

DESCRIPTION OF THE PREFERRED EMBODIMENTS

Hereinafter, the details of the present invention will be described.

The following description regarding components has been made based on a representative embodiment of the present invention. However, the present invention is not limited to the embodiment.

In this specification, numerical ranges represented by "to" include numerical values before and after "to" as lower limit values and upper limit values.

In addition, in this specification, "parallel" or "perpendicular" does not exactly represent "parallel" or "perpendicular" and represents a range of ±5° from "parallel" or "perpendicular".

In this specification, a liquid crystal composition and a liquid crystal compound include those that exhibit liquid crystal properties by curing or the like.

In this specification, an integral reflectivity refers to a ratio of an integrated value of intensity of light reflected in all the directions to an intensity of incidence light in a case where light is incident at a polar angle of 5° with respect to a surface (main surface) of a circularly polarized light reflecting layer (direction inclined by 5° from the normal direction of the surface of the circularly polarized light reflecting layer) and is reflected from the circularly polarized light reflecting layer.

In this specification, an integral reflectivity I-R($\lambda$) at a wavelength $\lambda$ is a value measured using the following method. Specifically, the integral reflectivity refers to an integral reflectivity at a wavelength $\lambda$, that is measured by optical trap using a device in which a large integrating sphere device (ILV-471, manufactured by JASCO Corporation) is attached to a spectrophotometer (V-550, manufactured by JASCO Corporation) in a case where light at a wavelength of 380 to 780 nm is incident at a polar angle of 5° with respect to the surface of the circularly polarized light reflecting layer.

In this specification, a specular reflectivity refers to a ratio of an intensity of a reflected light measured at a light receiving angle having a polar angle of 5° with respect to an azimuthal angle shifted by 180° from an azimuthal angle of incidence light to an intensity of incidence light in a case where light is incident at a polar angle of 5° with respect to a surface (main surface) of a circularly polarized light reflecting layer (direction inclined by 5° from the normal direction of the surface of the circularly polarized light reflecting layer) and is reflected from the circularly polarized light reflecting layer.

In this specification, the specular reflectivity refers to a specular reflectivity at a wavelength $\lambda$ that is measured using a device in which an absolute reflectivity measurement device ARV-474 is attached to a spectrophotometer (V-550, manufactured by JASCO Corporation) in a case where light at a wavelength of 380 to 780 nm is incident at a polar angle of 5° with respect to the surface of the circularly polarized light reflecting layer.

In this specification, a reflectivity $R[\theta,\phi](\lambda)$ that is measured at a light receiving angle having a polar angle $\phi$ with respect to an azimuthal angle shifted by 180° from an azimuthal angle of incidence light having a polar angle 0 at a wavelength $\lambda$ is measured using the following method.

Specifically, the reflectivity is a value measured using a gonio-spectrophotometric color measurement system (GCMS-3B, manufactured by Murakami Color Research Laboratory Co., Ltd.) after appropriately setting the incidence angle (polar angle, azimuthal angle), the light receiving angle (polar angle, azimuthal angle), and the measurement wavelength range such that light is incident into the surface of the circularly polarized light reflecting layer.

In this specification, a selective reflection wavelength is a value measured using the following method.

In a case where the integral reflectivity is measured using the above-described method, a spectrum waveform having a peak shape (upward protrusion shape) in which the horizontal axis represents a wavelength is obtained. At this time, an average reflectivity (arithmetic mean) of a maximum value and a minimum value of the integral reflectivity is obtained. Among two wavelengths at two intersections between the waveform and the average reflectivity, in a case where a value of a wavelength on a short wavelength side is represented by $\lambda\alpha$ (nm) and a value of a wavelength on a short wavelength side is represented by $\lambda\beta$ (nm), the selective reflection wavelength is calculated from the following expression.

Selective Reflection Wavelength=$(\lambda\alpha+\lambda\beta)/2$

Here, in the case of a sample having low diffusion reflecting properties and strong specular reflecting properties, a waveform of an integral reflection spectrum of the integral reflectivity may be scattered in a serrated shape. In this case, an average reflectivity (arithmetic mean) of a maximum value and a minimum value in a spectrum waveform of the above-described specular reflectivity is obtained. Among two wavelengths at two intersections between the waveform and the average reflectivity, in a case where a value of a wavelength on a short wavelength side is represented by $\lambda\alpha$ (nm) and a value of a wavelength on a short wavelength side is represented by $\lambda\beta$ (nm), the selective reflection wavelength is calculated from the following expression.

In this specification, Re ($\lambda$) and Rth ($\lambda$) represent an in-plane retardation and a thickness-direction retardation at a wavelength $\lambda$, respectively. Unless specified otherwise, the wavelength $\lambda$ refers to 550 nm.

In this specification, Re ($\lambda$) and Rth ($\lambda$) are values measured at the wavelength $\lambda$ using AxoScan OPMF-1 (manufactured by Opto Science Inc.). By inputting an average refractive index $((nx+ny+nz)/3)$ and a thickness (d ($\mu$m)) to AxoScan, the following expressions can be calculated.

Slow Axis Direction (°)

$Re(\lambda)=R0(\lambda)$ $Rth(\lambda)=((nx+ny)/2-nz)\times d$

R0 ($\lambda$) is expressed as a numerical value calculated by AxoScan OPMF-1 and represents Re ($\lambda$).

The average refractive index used in AxoScan is measured using an Abbe refractometer (NAR-4T, manufactured by Atago Co., Ltd.), and a sodium lamp ($\lambda$=589 nm) is used as a light source. In addition, the wavelength dependence can be measured using a combination of a multi-wavelength Abbe refractometer DR-M2 (manufactured by Atago Co., Ltd.) and an interference filter.

In addition, as the refractive index, values described in "Polymer Handbook" (John Wiley & Sons, Inc.) and catalogs of various optical films can also be used. The values of average refractive index of major optical films are as follows: cellulose acylate (1.48), cycloolefin polymer (1.52), polycarbonate (1.59), polymethyl methacrylate (1.49), and polystyrene (1.59).

In this specification, in a case where a plane of the circularly polarized light reflecting layer (main surface; a surface perpendicular to a thickness direction) is represented by an xy plane and a normal direction of the plane is represented by a z-axis, a polar angle refers to an angle inclined from the normal direction, and an azimuthal angle refers to an angle between the xy plane and a reference line.

<Decorative Sheet>

A decorative sheet according to an embodiment of the present invention comprises a circularly polarized light reflecting layer, a λ/4 plate A, a linear polarizer, and a λ/4 plate B in this order, in which the circularly polarized light reflecting layer includes one or more cholesteric liquid crystal layers having wavelength selective reflecting properties, I-R(630), I-R(550), and I-R(450) of the circularly polarized light reflecting layer are 30% or higher, and an angle between a slow axis of the λ/4 plate A and an absorption axis of the linear polarizer and an angle between a slow axis of the λ/4 plate B and the absorption axis of the linear polarizer are 45°±10°, respectively.

The present inventors found that a position where an element using external light is present and a position where the element using external light is not present can be made to be indistinguishable and the element using external light can be made to be inconspicuous by disposing a circularly polarized light reflecting layer including one or more cholesteric liquid crystal layers on a front surface of the element using external light and reflecting either left circularly polarized light or right circularly polarized light in the external light. At this time, since the single circularly polarized light in the external light transmits through the circularly polarized light reflecting layer, this transmitted light can be used.

On the other hand, in a case where only the circularly polarized light reflecting layer is used, light that reaches up to the element using external light is reflected from a surface of the element using external light, for example, from a lens. As a result, there is a problem in that a part of the reflected light reaches up to an observer and the element using external light is seen.

Therefore, it was found that, by blocking the light reflected from the surface of the element using external light using the λ/4 layer and the linear polarizer, light that reaches an observer can be reduced, and the element using external light can be effectively made to be inconspicuous.

FIG. 1 is a schematic cross-sectional view illustrating one embodiment of the decorative sheet according to the embodiment of the present invention.

As illustrated in FIG. 1, a decorative sheet 10 includes a circularly polarized light reflecting layer 12, a λ/4 plate A 14, a linear polarizer 16, and a λ/4 plate B 18. The circularly polarized light reflecting layer 12 includes a first cholesteric liquid crystal layer 20, a second cholesteric liquid crystal layer 22, and a third cholesteric liquid crystal layer 24 in this order. The first cholesteric liquid crystal layer 20, the second cholesteric liquid crystal layer 22, and the third cholesteric liquid crystal layer 24 have different selective reflection wavelengths.

In FIG. 1, the aspect in which the circularly polarized light reflecting layer includes three cholesteric liquid crystal layers has been described. However, the present invention is not limited to this aspect. An aspect in which the circularly polarized light reflecting layer includes one cholesteric liquid crystal layer or an aspect in which the circularly polarized light reflecting layer includes two or four or more cholesteric liquid crystal layers may be adopted.

Regarding a disposition relationship between the decorative sheet and the element using external light (in other words, the element using light transmitted through the decorative sheet), the decorative sheet and the element using external light are disposed in order from an observer viewpoint side. In addition, the decorative sheet is disposed such that the circularly polarized light reflecting layer in the decorative sheet faces the observer side.

In the decorative sheet 10, in external light incident from the circularly polarized light reflecting layer 12, one circularly polarized light component is reflected from the circularly polarized light reflecting layer 12, and another circularly polarized light component transmits through the circularly polarized light reflecting layer 12.

The transmitted circularly polarized light component is converted into linearly polarized light by the λ/4 plate A14. At this time, the slow axis of the λ/4 plate A and a transmission axis of the linear polarizer 16 are disposed such that a polarizing axis of linearly polarized light and the transmission axis of the linear polarizer are aligned (parallel to each other). Even in a case where the λ/4 plate A14 is not provided, the circularly polarized light component transmitted through the circularly polarized light reflecting layer 12 transmits through the linear polarizer 16. However, by using the λ/4 plate A14, light absorbed by the linear polarizer 16 can be reduced, and a decrease in the amount of light transmitted through the decorative sheet 10 can be suppressed.

The light transmitted through the linear polarizer 16 is used in the element using external light (not illustrated), but a part of the light is reflected from, for example, the surface of the element using external light.

Therefore, in the decorative sheet 10, first, linearly polarized light transmitted through the linear polarizer 16 is converted into circularly polarized light by the λ/4 plate B 18. Next, the converted circularly polarized light is reflected from the surface of the element using external light such that a turning direction thereof is reversed. In a case where the light reflected from the element is incident into the λ/4 plate B18, the light is converted into linearly polarized light such that a polarizing axis of the linearly polarized light transmitted through the λ/4 plate B18 is parallel to an absorption axis of the linear polarizer 16. Thus, this light is absorbed by the linear polarizer 16. This way, by disposing the linear polarizer 16 and the λ/4 plate B18, the light reflected from the element using external light is prevented from transmitting through the decorative sheet 10 such that the element using external light can be made to be inconspicuous.

Here, the disposition of each of the layers at a preferable angle changes depending on the circularly polarized light component reflected from the circularly polarized light reflecting layer.

In a case where the circularly polarized light reflecting layer reflects right circularly polarized light and the linear polarizer is observed from the λ/4 plate A side, it is preferable that the linear polarizer and the λ/4 plate A are arranged such that the absorption axis of the linear polarizer is shifted counterclockwise by 45°±10° from the slow axis of the λ/4 plate A. In a case where the circularly polarized light reflecting layer reflects left circularly polarized light and the linear polarizer is observed from the λ/4 plate A side, it is preferable that the linear polarizer and the λ/4 plate A are arranged such that the absorption axis of the linear polarizer is shifted clockwise by 45°±10° from the slow axis of the λ/4 plate A.

As described above, the angle between the slow axis of the λ/4 plate A and the absorption axis of the linear polarizer is preferably 45°±10°.

In addition, the angle between the slow axis of the λ/4 plate B and the absorption axis of the linear polarizer is preferably 45°±10°.

In a case where light is observed such that the light propagates toward the front side, the circularly polarized light is defined as follows: in a case where a distal end of an electric field vector rotates clockwise along with an increase in time, the light is right circularly polarized light; and in a case where a distal end of an electric field vector rotates counterclockwise along with an increase in time, the light is left circularly polarized light.

Hereinafter, each of the members constituting the decorative sheet will be described in detail.

(Circularly Polarized Light Reflecting Layer)

In a selective reflection wavelength range, the circularly polarized light reflecting layer selectively reflects either right circularly polarized light or left circularly polarized light and allows transmission of the other circularly polarized light.

I-R(630), I-R(550), and I-R(450) of the circularly polarized light reflecting layer are 30% or higher, respectively.

Here, as described above, I-R(λ) represents an integral reflectivity at a wavelength λ nm.

By adopting the above-described value, the element using light transmitted through the decorative sheet can be made to be more inconspicuous.

From the viewpoint of making the element using light transmitted through the decorative sheet more inconspicuous (hereinafter also referred to as "from the viewpoint of further improving the effects of the present invention"), the range of I-R(630) is preferably 35% to 50% and more preferably 40% to 50%.

From the viewpoint of further improving the effects of the present invention, the range of I-R(550) is preferably 35% to 50% and more preferably 40% to 50%.

From the viewpoint of further improving the effects of the present invention, the range of I-R(450) is preferably 35% to 50% and more preferably 40% to 50%.

Further, from the viewpoint of further reducing a tint change of the decorative sheet in case of being seen from an oblique direction, the range of I-R(730) (an integral reflectivity at a wavelength of 750 nm) is preferably 30% or longer, 35% to 50%, and still more preferably 40% to 50%.

In addition, S-R(630), S-R(550), and S-R(450) of the circularly polarized light reflecting layer are preferably 30% or lower, respectively.

Here, as described above, S-R(λ) represents a specular reflectivity at a wavelength λ nm.

By adopting the above-described value, the element using light transmitted through the decorative sheet can be made to be more inconspicuous in case of being seen from an oblique direction.

From the viewpoint of further improving the effects of the present invention, the range of S-R(630) is preferably 5% to 20% and more preferably 5% to 15%.

From the viewpoint of further improving the effects of the present invention, the range of S-R(550) is preferably 5% to 20% and more preferably 5% to 15%.

From the viewpoint of further improving the effects of the present invention, the range of S-R(450) is preferably 5% to 20% and more preferably 5% to 15%.

In addition, it is preferable that the circularly polarized light reflecting layer satisfies Expressions (A1) to (C1).

$$R[45,35](630)/R[45,20](630) \leq 10.0 \qquad \text{Expression (A1)}$$

$$R[45,35](550)/R[45,20](550) \leq 10.0 \qquad \text{Expression (B1)}$$

$$R[45,35](450)/R[45,20](450) \leq 10.0 \qquad \text{Expression (C1)}$$

Here, R[45,35](λ) represents a reflectivity at a wavelength λ with respect to incidence light with a polar angle of 45° to the circularly polarized light reflecting layer, the reflectivity being measured at a light receiving angle having a polar angle of 35° with respect to an azimuthal angle shifted by 180° from an azimuthal angle of the incidence light.

R[45,20](λ) represents a reflectivity at a wavelength λ with respect to incidence light with a polar angle of 45° to the circularly polarized light reflecting layer, the reflectivity being measured at a light receiving angle having a polar angle of 20° with respect to an azimuthal angle shifted by 180° from an azimuthal angle of the incidence light.

Further, it is more preferable that the circularly polarized light reflecting layer satisfies the following Expressions (A2) to (C2).

$$R[45,35](630)/R[45,20](630) \leq 4.0 \qquad \text{Expression (A2)}$$

$$R[45,35](550)/R[45,20](550) \leq 4.0 \qquad \text{Expression (B2)}$$

$$R[45,35](450)/R[45,20](450) \leq 4.0 \qquad \text{Expression (C2)}$$

The lower limit of R[45,35](630)/R[45,20](630) is not particularly limited and is preferably 1.0 or higher.

The lower limit of R[45,35](550)/R[45,20](550) is not particularly limited and is preferably 1.0 or higher.

The lower limit of R[45,35](450)/R[45,20](450) is not particularly limited and is preferably 1.0 or higher.

in which the circularly polarized light reflecting layer includes one or more cholesteric liquid crystal layers having wavelength selective reflecting properties.

The cholesteric liquid crystal layer is a layer having wavelength selective reflecting properties and is preferably a layer obtained by immobilizing a liquid crystal compound in a cholesterically aligned state. In other words, the cholesteric liquid crystal layer is more preferably a layer obtained by immobilizing a cholesteric liquid crystalline phase. The cholesterically aligned state may be an aligned state where right circularly polarized light is reflected or an aligned state where left circularly polarized light is reflected.

Here, the state where a cholesteric liquid crystalline phase is "immobilized" refers to a state in which the alignment of the liquid crystal compound as the cholesteric liquid crystalline phase is immobilized. More specifically, it is preferable that the state where the cholesteric liquid crystalline phase is "immobilized" is a state where the immobilized alignment state can be stably maintained without being fluid and being changed by an external field or an external force in a temperature range of typically 0° C. to 50° C., more strictly, −30° C. to 70° C. The cholesteric liquid crystalline layer is not particularly limited as long as the optical characteristics of the cholesteric liquid crystalline phase are maintained, and the liquid crystal compound in the layer does not necessarily exhibit liquid crystallinity.

The cholesteric liquid crystal layer is preferably a layer formed of a composition including a liquid crystal compound and is a layer obtained by aligning a cholesteric liquid crystalline phase of a polymerizable liquid crystal compound (liquid crystal compound having a polymerizable group) and then curing the aligned polymerizable liquid crystal compound by light irradiation or the like.

The kind of the liquid crystal compound is not particularly limited, and examples thereof include various well-known compounds. In terms of shape, the liquid crystal compound can be classified into a rod-like type (rod-like liquid crystal compound) and a discotic type (discotic liquid crystaline compound, disk-like liquid crystal compound). From the viewpoint of adjusting the number of helical pitches, a rod-like liquid crystal compound is preferable.

The liquid crystal compound may have a polymerizable group. The kind of the polymerizable group is not particularly limited, and a functional group capable of an addition polymerization reaction is preferable, and a polymerizable ethylenically unsaturated group or a ring polymerizable group is more preferable. More specifically, as the polymerizable group, a (meth)acryloyl group, a vinyl group, a styryl group, an allyl group, an epoxy group, or an oxetane group is preferable, and a (meth)acryloyl group is more preferable.

The composition may include a chiral agent.

The kind of the chiral agent is not particularly limited. The chiral agent may be liquid crystalline or amorphous. The chiral agent can be selected from various well-known chiral agents (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199). In general, the chiral agent has an asymmetric carbon atom. However, an axially asymmetric compound or a surface asymmetric compound not having an asymmetric carbon atom can also be used as a chiral agent. Examples of the axially asymmetric compound or the surface asymmetric compound include binaphthyl, helicene, paracyclophane, and derivatives thereof. The chiral agent may include a polymerizable group.

As the chiral agent, one kind may be used alone, or two or more kinds may be used in combination.

The content of the chiral agent in the composition is not particularly limited, and is preferably 0.5 to 30 mass % with respect to the total mass of the liquid crystal compound.

The composition may include a polymerization initiator. In particular, in a case where the liquid crystal compound has a polymerizable group, it is preferable that the composition includes a polymerization initiator.

It is preferable that the polymerization initiator is a photopolymerization initiator that can initiate a polymerization reaction by ultraviolet irradiation.

The content of the polymerization initiator in the composition is not particularly limited, and is preferably 0.1 to 20 mass % and more preferably 1 to 8 mass % with respect to the total mass of the liquid crystal compound.

The composition may include a surfactant. By the composition including a surfactant, the surfactant functions as an alignment controller such that the formation of a cholesteric liquid crystalline phase can be stably or rapidly formed.

The content of the surfactant in the composition is not particularly limited, and is preferably 0.01 to 10 mass % and more preferably 0.01 to 5 mass % with respect to the total mass of the liquid crystal compound.

The composition may include a solvent.

Examples of the solvent include water and an organic solvent. Examples of the organic solvent include an amide, a sulfoxide, a heterocyclic compound, a hydrocarbon, an alkyl halide, an ester, a ketone, and an ether.

The composition may include other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a dispersant, and a coloring material such as a dye or a pigment.

A method of manufacturing the cholesteric liquid crystal layer is not particularly limited, and from the viewpoint of adjusting the number of helical pitches in the cholesteric liquid crystal layer, a method including: applying the composition to a support to form a coating film; heating the coating film to cholesterically align the liquid crystal compound; and immobilizing the formed cholesteric liquid crystalline phase to form the cholesteric liquid crystal layer is preferable.

Hereinafter, the procedure of the method will be described in detail.

First, the kind of the support to which the composition is applied is not particularly limited. The support may be a temporary support that is released after the formation of the cholesteric liquid crystal layer.

As the support (temporary support), for example, a plastic film or a glass substrate may be used.

Optionally, an alignment film may be provided on the support. In addition, the support surface may be rubbed such that the composition is applied to the rubbed surface.

In addition, optionally, an undercoat layer may be provided on the support.

Examples of the undercoat layer include an undercoat layer including a (meth)acrylic resin, a polyvinyl alcohol resin, a polyolefin resin, a cycloolefin polymer resin, a polycarbonate resin, a polyurethane resin, a polystyrene resin, a polyimide resin, an epoxy resin, a polyester resin, or a polyether resin.

The (meth)acrylic resin may be a resin obtained by curing polyfunctional (meth)acrylic monomers, for example, pentaerythritol triacrylate or pentaerythritol tetraacrylate.

It is preferable that no alignment restriction force or a weak alignment restriction force is applied to the undercoat layer. For example, it is preferable that a rubbing treatment is not performed or a weak rubbing treatment is performed. By applying an appropriate alignment restriction force, a wavy structure described below can be obtained.

A method of applying the composition to the support is not particularly limited, and examples thereof include Examples include a wire bar coating method, a curtain coating method, an extrusion coating method, a direct gravure coating method, a reverse gravure coating method, a die coating method, a spin coating method, a dip coating method, and a spray coating method.

Next, by heating the formed coating film, the liquid crystal compound can be cholesterically aligned. The heating temperature is preferably 200° C. or lower and more preferably 130° C. or lower. Due to the alignment treatment, the liquid crystal compound is twisted to have a helical axis in a direction substantially perpendicular to the support surface.

Examples of a method of immobilizing the formed cholesteric liquid crystalline phase include a method polymerizing the liquid crystal compound in a case where the liquid crystal compound has a polymerizable group. Regarding the polymerization, thermal polymerization or photopolymerization may be performed, and photopolymerization is preferable.

The cholesteric liquid crystal layer exhibits circularly polarized light selective reflection due to the helical structure of the cholesteric liquid crystalline phase. Typically, a selective reflection wavelength $\lambda$ of the selective reflection of the cholesteric liquid crystalline phase depends on a pitch length P (=helical cycle:helical pitch length) of a helical structure and satisfies a relationship of $\lambda = n \times P$ between the pitch length P and an average refractive index n of the cholesteric liquid crystal layer. Therefore, the wavelength at which the circularly polarized light selective reflection are exhibited can be adjusted by adjusting the helical pitch length P. The helical pitch length of the cholesteric liquid crystalline phase depends on the kind of a chiral agent which is used in combination of a liquid crystal compound, or the concentration of the chiral agent added. Therefore, a desired helical pitch length can be obtained by adjusting the kind and concentration of the chiral agent.

For example, in a case where the selective reflection wavelength of the cholesteric liquid crystal layer is positioned in a visible range, the selective reflection wavelength may be positioned at any one of a blue light range (a range having a wavelength of 400 nm or longer and shorter than 500 nm), a green light range (a range having a wavelength of 500 nm or longer and shorter than 600 nm), or a red light range (a range having a wavelength of 600 nm or longer and shorter than 700 nm).

In a case where the circularly polarized light reflecting layer includes one or more cholesteric liquid crystal layers, the cholesteric liquid crystal layer may include a plurality of cholesteric liquid crystal layers.

In a case where the cholesteric liquid crystal layer may include a plurality of cholesteric liquid crystal layers, it is preferable that turning directions of circularly polarized light components reflected from the respective cholesteric liquid crystal layers are the same. That is, in a case where the circularly polarized light reflecting layer includes a plurality of cholesteric liquid crystal layers, it is preferable that all the cholesteric liquid crystal layer reflect right circularly polarized light or all the cholesteric liquid crystal layer reflect left circularly polarized light.

In a case where the circularly polarized light reflecting layer includes a plurality of cholesteric liquid crystal layers, it is preferable that the respective liquid crystal layers have different selective reflection wavelengths. For example, the circularly polarized light reflecting layer may include a cholesteric liquid crystal layer that has a selective reflection wavelength in a blue light range, a cholesteric liquid crystal layer that has a selective reflection wavelength in a green light range, and a cholesteric liquid crystal layer that has a selective reflection wavelength in a red light range.

Further, in a case where the circularly polarized light reflecting layer includes a plurality of cholesteric liquid crystal layers, it is preferable that, in the respective layers, a selective reflection wavelength closest to the linear polarizer is the longest and the selective reflection wavelengths decrease in order from the linear polarizer.

In addition, the cholesteric liquid crystal layer may be a layer in which the helical pitch length changes along a thickness direction. With this cholesteric liquid crystal layer, in a case where the circularly polarized light reflecting layer includes only one cholesteric liquid crystal layer, all the light components in a blue light range, a green light range, and a red light range can also be reflected by adjusting the helical pitch length.

In addition, in a case where a cross-section of the cholesteric liquid crystal layer is observed using a scanning electron microscope (SEM), it is preferable that the cross-section has a stripe pattern including bright portions and dark portions.

It is preferable that the stripe pattern has a wavy structure, and an average distance between peaks in the wavy structure is preferably 0.5 to 50 μm, more preferably 1.5 to 10 μm, and still more preferably 2.5 to 5.0 μm.

In this specification, the wavy structure refers to a structure in which at least one region M where an absolute value of an inclination angle of a continuous line of bright portions or dark portions in the stripe pattern with respect to a plane of the cholesteric liquid crystal layer is 5° or more is present, and a peak or valley having an inclination angle of 0° is specified at two points most adjacent to each other with the region M interposed therebetween.

The peak or valley having an inclination angle of 0° may have a protrusion shape or a recessed shape. However, the peak or valley may be a point having a stepwise shape or a rack shape as long as it has an inclination angle of 0°. In the wavy structure, it is preferable that the region M in which an absolute value of an inclination angle of a continuous line of bright portions or dark portions in the stripe pattern is 5° or more and the peak or valley in which the region M is interposed are repeated.

In addition, the average distance between peaks in the wavy structure is obtained by measuring the distance of the cholesteric liquid crystal layer in a plane direction regarding the peak or valley having an inclination angle of 0° at the two points most adjacent to each other with the region M interposed therebetween and obtaining the average of distance values at all the thicknesses in a case where the length of the cholesteric liquid crystal layer in a major axis direction of a cross-section is 100 μm.

Here, in a case where each of continuous lines is in contact with any one interfaces of a film and is interrupted, opposite ends of the interrupted portion are not considered as a peak or valley. In addition, in a case where each of continuous lines has a bent structure, the continuous line is considered to be interrupted, and opposite ends of the interrupted portion are not considered as a peak or valley.

(λ/4 Plate)

The λ/4 plate A and the λ/4 plate B are not particularly limited as long as they are various well-known λ/4 plates, respectively.

The λ/4 plate is a plate having a λ/4 function, specifically, a plate having a function of converting linearly polarized light having a specific wavelength into circularly polarized light (or converting circularly polarized light into linearly polarized light).

Re(550) of the λ/4 plate A and the λ/4 plate B are not particularly limited and is preferably 110 to 160 nm and more preferably 120 to 150 nm from the viewpoint of usefulness as the λ/4 plate.

Each of the λ/4 plate A and the λ/4 plate B may have a single-layer structure or a multi-layer structure. Examples of an aspect in which the λ/4 plate A and the λ/4 plate B has a single-layer structure or a multi-layer structure include a broadband λ/4 plate in which a λ/4 plate and a λ/2 plate are laminated.

The λ/2 plate refers to an optically-anisotropic layer in which an in-plane retardation Re(λ) at a specific wavelength λ nm satisfies Re(λ)≈λ/2.

Examples of the λ/4 plate A and the λ/4 plate B include: (1) a phase difference plate described in JP1993-027118A (JP-H05-027118A) and JP1993-027119A (JP-H05-027119A) in which a birefringent film having a high retardation and a birefringent film having a low retardation are laminated such that optical axes thereof are perpendicular to each other; (2) a phase difference plate described in JP1998-068816A (JP-H10-068816A) in which a polymer film that is a λ/4 plate at a specific wavelength and a polymer film that is a λ/2 plate formed of the same material as that of the λ/4 plate at the same wavelength as that of the λ/4 plate are laminated to obtain an λ/4 plate having a wide wavelength range; (2) a phase difference plate described in JP1998-090521A (JP-H10-090521A) in which two polymer films are laminated such that a λ/4 wavelength can be achieved in a wide wavelength range; (3) a phase difference plate described in WO00/026705A in which a λ/4 wavelength can be achieved in a wide wavelength range using a modified polycarbonate film; and (4) a phase difference plate described in WO00/065384A in which a λ/4 wavelength can be achieved in a wide wavelength range using a cellulose acetate film.

As the λ/4 plate A and the λ/4 plate B, a commercially available product can also be used. Examples of the commercially available product include PURE ACE (registered trade name) WR (a polycarbonate film, manufactured by Teijin Ltd.).

The λ/4 plate A and the λ/4 plate B may be formed by aligning and fixing a polymerizable liquid crystal compound or a polymer liquid crystal compound.

For example, the λ/4 plate A and the λ/4 plate B can be formed by applying a liquid crystal composition to a temporary support, an alignment film, or a front surface plate, nematically aligning a polymerizable liquid crystal compound in the liquid crystal composition in a liquid crystal state, and then immobilizing the polymerizable liquid crystal compound by photocrosslinking or thermal crosslinking.

In addition, the λ/4 plate A and the λ/4 plate B may be obtained by applying a composition including a polymer liquid crystal compound to a temporary support, an alignment film, or a front surface plate, nematically aligning the polymer liquid crystal compound in a liquid crystal state, and cooling the polymer liquid crystal compound to immobilize the alignment.

(Linear Polarizer)

The linear polarizer is not particularly limited as long as it is a member having a function of converting light into specific linearly polarized light, and examples thereof include an absorbing polarizer and a reflecting polarizer.

As the absorbing polarizer, for example, an iodine polarizer, a dye polarizer using a dichroic dye, or a polyene polarizer can be used. As the iodine polarizer and the dye polarizer, any one of a coating type polarizer or a stretching type polarizer can be used, and a polarizer manufactured by adsorbing iodine or a dichroic dye to polyvinyl alcohol and performing stretching is preferable.

In addition, examples of a method of obtaining a polarizer by performing stretching and dyeing on a laminated film in which a polyvinyl alcohol layer is formed on the substrate include methods described in JP5048120B, JP5143918B, JP5048120B, JP4691205B, JP4751481B, and JP4751486B.

In particular, from the viewpoint of further improving adhesiveness with another layer, a polarizer including a polyvinyl alcohol resin (a polymer including —$CH_2$—CHOH— as a repeating unit; in particular, at least one selected from the group consisting of polyvinyl alcohol and an ethylene-vinyl alcohol copolymer) is preferable.

The thickness of the linear polarizer is not particularly limited and is preferably 3 to 60 μm, more preferably 5 to 30 μm, and still more preferably 5 to 15 μm.

The decorative sheet may include a member other than the circularly polarized light reflecting layer, the λ/4 plate A, the linear polarizer, and the λ/4 plate B.

For example, in order to improve adhesiveness between the respective layers, the decorative sheet may further include a bonding layer. As the bonding layer, any bonding layer formed of one of well-known various materials can be used as long as it is a layer that can bond the respective members to each other. For example, the bonding layer may be a layer (adhesive layer) formed of an adhesive that has fluidity during bonding and becomes a solid after bonding, a layer (pressure sensitive adhesive layer) formed of a pressure sensitive adhesive that is a gel-like (rubber-like) flexible solid during bonding and of which the gel state does not change after bonding, or a layer formed of a material having characteristics of both the adhesive and the pressure sensitive adhesive. Specific examples of the bonding layer include an optical clear adhesive, an optically transparent double-sided tape, and an ultraviolet curable resin.

In the decorative sheet, the circularly polarized light reflecting layer, the λ/4 plate A, the linear polarizer, and the λ/4 plate B may be brought into direct contact with each other without providing the bonding layer.

The decorative sheet may include a substrate between the respective layers.

The kind of the substrate is not particularly limited, and examples thereof include a laminate including: a support; and an alignment film or an undercoat layer that is disposed on the support.

<Optical Device>

An optical device according to the embodiment of the present invention comprises: the above-described decorative sheet; and an element (element using external light) using light transmitted through the decorative sheet. In the optical device according to the embodiment of the present invention, by using the above-described decorative sheet, light reflected from a surface or the like of the element using light transmitted through the decorative sheet can be prevented from reaching the outside of the optical device, and thus the element using light transmitted through the decorative sheet can be made to be more inconspicuous.

In the optical device, the decorative sheet is disposed such that the circularly polarized light reflecting layer is positioned on the visible side.

The decorative sheet may be directly disposed on the surface of the element using light transmitted through the decorative sheet or may be disposed to be spaced at a predetermined interval.

(Element Using Light transmitted Through Decorative Sheet)

The element using light transmitted through the decorative sheet is not particularly limited, and examples thereof include various elements such as an image pickup element or a sensor.

<Image Display Device>

The image display device according to the embodiment of the present invention comprises the above-described decorative sheet and an image display element.

In the image display device, the decorative sheet is disposed such that the circularly polarized light reflecting layer is positioned on the visible side.

(Image Display Element)

The image display element is not particularly limited as long as it is an image display element that is typically used, and examples thereof include various display elements such as a liquid crystal cell or an organic electroluminescence (EL) display element.

EXAMPLES

Hereinafter, the present invention will be described in detail using Examples. Materials, reagents, amounts thereof, proportions thereof, operations, and the like shown in the following examples can be appropriately changed as long as they do not depart from the scope of the present invention. Accordingly, the present invention is not limited to the following examples.

Example 1

(Preparation of Transparent Support 1)

The following components were charged into a mixing tank and were stirred while heating them. As a result, a cellulose ester solution for an air layer was prepared.

Composition of Cellulose Ester Solution for Air Layer

Cellulose ester (acetyl substitution degree: 2.86): 100 parts by mass

Sugar ester compound represented by Formula (R-I): 3 parts by mass

Sugar ester compound represented by Formula (R-II): 1 part by mass

The following ultraviolet absorber: 2.4 parts by mass

Silica particle dispersion (average particle size: 16 nm, "AEROSIL R 972", manufactured by Nippon Aerosil Co., Ltd.): 0.026 parts by mass Methylene chloride: 339 parts by mass Methanol: 74 parts by mass Butanol: 3 parts by mass Formula (R-1)

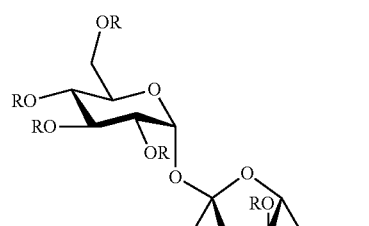

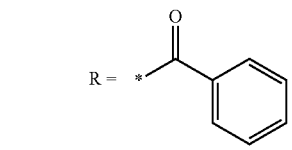

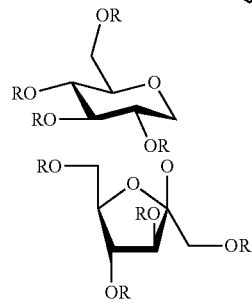

R = Acetate/i-Butylate (2/8)

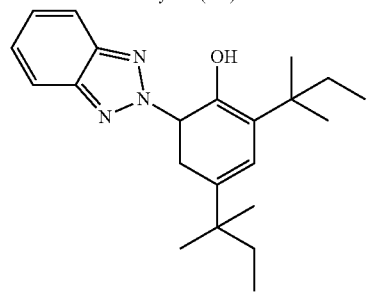

Ultraviolet Absorber

The following components were charged into a mixing tank and were stirred while heating them. As a result, a cellulose ester solution for a drum layer was prepared.

Composition of Cellulose Ester Solution for Drum Layer

Cellulose ester (acetyl substitution degree: 2.86): 100 parts by mass

Sugar ester compound represented by Formula (R-I): 3 parts by mass

Sugar ester compound represented by Formula (R-II): 1 part by mass

The above-described ultraviolet absorber: 2.4 parts by mass

Silica particle dispersion (average particle size: 16 nm, "AEROSIL R 972", manufactured by Nippon Aerosil Co., Ltd.): 0.091 parts by mass Methylene chloride: 339 parts by mass Methanol: 74 parts by mass Butanol: 3 parts by mass The following components were charged into a mixing tank and were stirred while heating them. As a result, a cellulose ester solution for a core layer was prepared.

Composition of Cellulose Ester Solution for Core Layer

Cellulose ester (acetyl substitution degree: 2.86): 100 parts by mass

Sugar ester compound represented by Formula (R-II): 8.3 parts by mass

Sugar ester compound represented by Formula (R-II): 2.8 parts by mass

The above-described ultraviolet absorber: 2.4 parts by mass

Methylene chloride: 266 parts by mass

Methanol: 58 parts by mass

Butanol: 2.6 parts by mass

As a casting die, a device in which a feed block adjusted for a co-casting is provided to form a film having a three-layer structure was used. The cellulose ester solution for an air layer, the cellulose ester solution for a core layer, and the cellulose ester solution for a drum layer were co-cast from a casting nozzle on a drum (specular stainless steel support) having a diameter of 3 m cooled to −7° C. At this time, the flow rates of the respective dopes were adjusted such that a thickness ratio was air layer/core layer/drum layer=7/90/3. Dry air at 34° C. was blown to the drum at 270 m³/min.

At a position 50 cm before an end point of the casting portion, a cellulose ester film that was cast and rotated was peeled off from the drum, and opposite ends thereof were clipped using a pin tenter. During peeling, the cellulose ester film was stretched to 5% along a transport direction (longitudinal direction).

The cellulose ester web held by the pin tenter was transported to a drying zone. Dry air at 45° C. was blown during initial drying, and then the cellulose ester web was dried at 110° C. for 5 minutes. At this time, the cellulose ester web was transported while being stretched to a ratio of 10% in a width direction.

By continuously cutting portions held by the pin tenter after peeling off the web from the pin tenter, an uneven portion having a width of 15 mm and a height of 10 μm was provided on opposite end portions of the web in the width direction. At this time, the width of the web was 1610 mm. While pulling the obtained web in the transport direction at 210 N to apply stress, the web was dried at 140° C. for 10 minutes. Further, the end portions in the width direction were continuously cut such that the web had a desired width. As a result, a cellulose ester film having a thickness of 41 μm was prepared.

This film was set as a transparent support 1.

(Preparation of Undercoat Layer)

An undercoat layer coating solution 1 having the following composition was applied to a surface of the transparent support 1 using a #3.6 wire bar coater. Next, the transparent support 1 to which the undercoat layer coating solution was applied was dried at 45° C. for 60 seconds and was irradiated with ultraviolet light at 500 mJ/cm² at 25° C. using an ultraviolet irradiation device. As a result, the transparent support 1 with the undercoat layer was prepared.

(Undercoat Layer Coating Solution 1)

KAYARAD PET30 (manufactured by Nippon Kayaku Co., Ltd.): 100 parts by mass

IRGACURE 907 (manufactured by Ciba-Geigy): 3 parts by mass

KAYACURE DETX (manufactured by Nippon Kayaku Co., Ltd.): 1 part by mass

Surfactant F1 having the following structure: 0.01 parts by mass

Methyl isobutyl ketone: 243 parts by mass

Surfactant F1

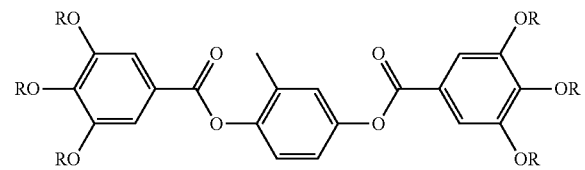

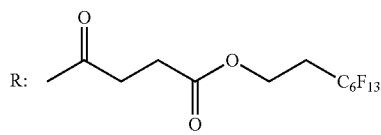

(Preparation of Cholesteric Liquid Crystal Layer B1)

The following components were stirred in a container held at 25° C. to prepare a coating solution B1 for a cholesteric liquid crystal layer.

(Coating Solution B1 for Cholesteric Liquid Crystal Layer)

Methyl ethyl ketone: 258 parts by mass

Mixture L1 of the following rod-like liquid crystal compounds: 100 parts by mass IRGACURE 907 (manufactured by Ciba-Geigy): 3 parts by mass KAYACURE DETX (manufactured by Nippon Kayaku Co., Ltd.): 1 part by mass Chiral agent A having the following structure: 6.71 parts by mass Surfactant F1 having the above-described structure: 0.03 parts by mass Surfactant F2 having the following structure: 0.07 parts by mass Mixture L1 of the following rod-like liquid crystal compounds

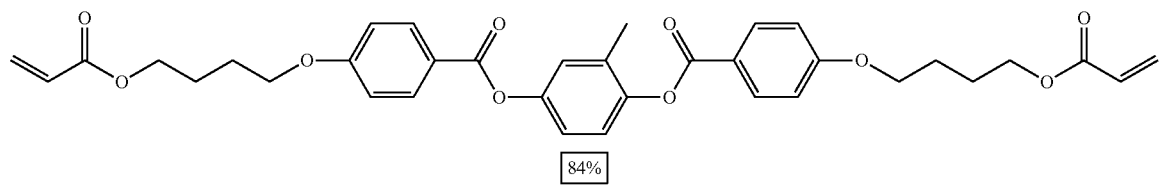

84%

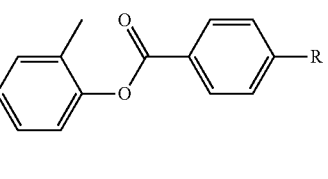

14%

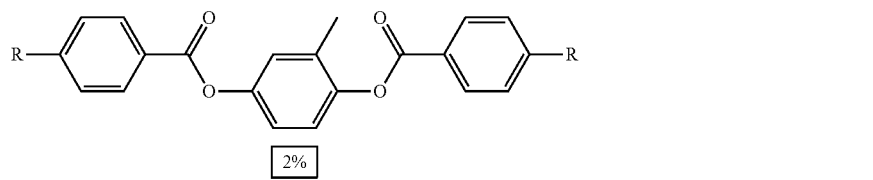

2%

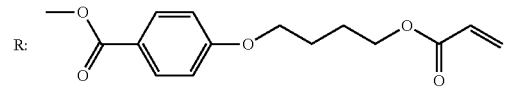

Numerical values are represented by mass %. In addition, R represents a group to be bonded to an oxygen atom.

Chiral Agent A

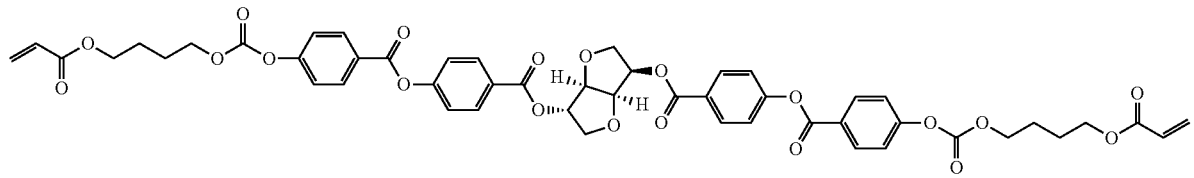 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Surfactant F2

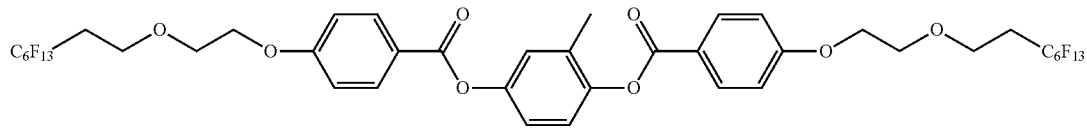

The coating solution B1 for a cholesteric liquid crystal layer is a material for forming a cholesteric liquid crystal layer that reflects light at a selective reflection wavelength of 450 nm. In addition, the coating solution B1 for a cholesteric liquid crystal layer is a material for forming a reflecting layer that reflects right circularly polarized light. That is, the coating solution B1 for a cholesteric liquid crystal layer is a material for reflecting right circularly polarized blue light.

The coating solution B1 for a cholesteric liquid crystal layer was applied to a surface of the transparent support 1 with the undercoat layer using a #8.0 wire bar coater. Next, the obtained transparent support 1 was dried at 95° C. for 60 seconds and was irradiated with ultraviolet light at 500 mJ/cm$^2$ at 25° C. using an ultraviolet irradiation device. As a result, a cholesteric liquid crystal layer B1 reflecting light having a selective reflection wavelength of 450 nm was prepared.

(Preparation of Cholesteric Liquid Crystal Layer G1)

A coating solution G1 for a cholesteric liquid crystal layer was prepared to have the same composition as that of the coating solution B1 for a cholesteric liquid crystal layer, except that the addition amount of the chiral agent A was changed to 5.48 parts by mass.

The coating solution G1 for a cholesteric liquid crystal layer is a material for forming a cholesteric liquid crystal layer that reflects light at a selective reflection wavelength of 550 nm. In addition, the coating solution G1 for a cholesteric liquid crystal layer is a material for forming a reflecting layer that reflects right circularly polarized light. That is, the coating solution G1 for a cholesteric liquid crystal layer is a material for reflecting right circularly polarized green light.

The coating solution G1 for a cholesteric liquid crystal layer was applied to a surface of the transparent support 1 with the undercoat layer using a #9.0 wire bar coater. Next, the obtained transparent support 1 was dried at 95° C. for 60 seconds and was irradiated with ultraviolet light at 500 mJ/cm$^2$ at 25° C. using an ultraviolet irradiation device. As a result, a cholesteric liquid crystal layer G1 reflecting light having a selective reflection wavelength of 550 nm was prepared.

(Preparation of Cholesteric Liquid Crystal Layer R1)

A coating solution R1 for a cholesteric liquid crystal layer was prepared to have the same composition as that of the coating solution B1 for a cholesteric liquid crystal layer, except that the addition amount of the chiral agent A was changed to 4.78 parts by mass.

The coating solution R1 for a cholesteric liquid crystal layer is a material for forming a cholesteric liquid crystal layer that reflects light at a selective reflection wavelength of 630 nm. In addition, the coating solution R1 for a cholesteric liquid crystal layer is a material for forming a reflecting layer that reflects right circularly polarized light. That is, the coating solution R1 for a cholesteric liquid crystal layer is a material for reflecting right circularly polarized red light.

The coating solution R1 for a cholesteric liquid crystal layer was applied to a surface of the transparent support 1 with the undercoat layer using a #10.0 wire bar coater. Next, the obtained transparent support 1 was dried at 95° C. for 60 seconds and was irradiated with ultraviolet light at 500 mJ/cm$^2$ at 25° C. using an ultraviolet irradiation device. As a result, a cholesteric liquid crystal layer R1 reflecting light having a selective reflection wavelength of 630 nm was prepared.

The support side of the cholesteric liquid crystal layer G1 was bonded to the liquid crystal layer side of the cholesteric liquid crystal layer R1 using a pressure sensitive adhesive SK2057 (manufactured by Soken Chemical & Engineering Co., Ltd.). Further, the support side of the cholesteric liquid crystal layer B1 was bonded to the liquid crystal layer side of the cholesteric liquid crystal layer G1 using a pressure sensitive adhesive SK2057 (manufactured by Soken Chemical & Engineering Co., Ltd.). As a result, a circularly polarized light reflecting layer 1 was obtained.

(Preparation of λ/4 Plate)

An λ/4 plate was prepared by forming an alignment film and an optically-anisotropic layer on the transparent support 1 as a support with reference to Examples (paragraphs "0272" to "0282") described in JP2012-018396A. Re(550) and Rth(550) of the λ/4 plate were 130 nm and −5 nm, respectively.

(Preparation of Decorative Sheet)

A polyvinyl alcohol (PVA) film having a thickness of 80 μm was dipped and dyed in an iodine aqueous solution having an iodine concentration of 0.05 mass % at 30° C. for 60 seconds. Next, the film was vertically stretched to five times the original length while being dipped in a boric acid acid aqueous solution having a boric acid concentration of 4 mass % for 60 seconds, and was dried at 50° C. for 4 minutes to obtain a polarizer 1 having a thickness of 20 μm.

The prepared λ/4 plate was dipped in a sodium hydroxide aqueous solution at 1.5 mol/L at 55° C. and was sufficiently cleaned with water to remove sodium hydroxide. Next, the λ/4 plate was dipped in a dilute sulfuric acid aqueous solution at 0.005 mol/L at 35° C. for 1 minute and was sufficiently cleaned with water to dilute sulfuric acid. Finally, the sample was sufficiently dried at 120° C. Two λ/4 plates were prepared and were bonded to each other with the polarizer 1 interposed therebetween such that the support side was the polarizer side. As a result, a laminate 1 was prepared.

Next, the laminate 1 was bonded to the support side of the cholesteric liquid crystal layer R1 constituting the prepared circularly polarized light reflecting layer 1 using a pressure sensitive adhesive SK2057 (manufactured by Soken Chemical & Engineering Co., Ltd.). As a result, a decorative sheet 1 was prepared.

Here, angles between the absorption axis of the polarizer 1 and the slow axes of the two λ/4 plates were 45°, respectively. In a case where the linear polarizer was observed from the λ/4 plate on the circularly polarized light reflecting layer side, the linear polarizer was disposed at an angle such that the absorption axis of the linear polarizer was shifted counterclockwise by 45° from the slow axis of the λ/4 plate.

Example 2

A decorative sheet 2 was prepared using the same method as that of Example 1, except that the thickness of each of the cholesteric liquid crystal layers was changed by changing the count of the wire bar coater.

Example 3

(Preparation of Cholesteric Liquid Crystal Layer IR3)

A coating solution IR3 for a cholesteric liquid crystal layer was prepared to have the same composition as that of the coating solution B1 for a cholesteric liquid crystal layer according to Example 1, except that the addition amount of the chiral agent A was changed to 4.01 parts by mass.

The coating solution IR3 for a cholesteric liquid crystal layer is a material for forming a cholesteric liquid crystal layer that reflects light at a selective reflection wavelength of 750 nm. In addition, the coating solution IR3 for a cholesteric liquid crystal layer is a material for forming a reflecting layer that reflects right circularly polarized light. That is, the coating solution IR3 for a cholesteric liquid crystal layer is a material for reflecting right circularly polarized infrared light.

The coating solution IR3 for a cholesteric liquid crystal layer was applied to a surface of the transparent support 1 with the undercoat layer using a #10.0 wire bar coater. Next, the obtained transparent support 1 was dried at 95° C. for 60 seconds and was irradiated with ultraviolet light at 500 mJ/cm$^2$ at 25° C. using an ultraviolet irradiation device. As a result, a cholesteric liquid crystal layer IR3 reflecting light having a selective reflection wavelength of 750 nm was prepared.

(Preparation of Decorative Sheet 3)

The liquid crystal layer side of the cholesteric liquid crystal layer IR3 was bonded to the support side of the cholesteric liquid crystal layer R1 constituting the circularly polarized light reflecting layer 1 using a pressure sensitive adhesive SK2057 (manufactured by Soken Chemical & Engineering Co., Ltd.). As a result, a circularly polarized light reflecting layer 3 was prepared. Further, the laminate 1 was bonded to the support side of the cholesteric liquid crystal layer IR3 of the prepared circularly polarized light reflecting layer 3 using a pressure sensitive adhesive SK2057 (manufactured by Soken Chemical & Engineering Co., Ltd.). As a result, a decorative sheet 3 was prepared.

Example 4

A decorative sheet 4 was prepared using the same method as that of Example 1, except that the addition amount of the surfactant F1 used in the cholesteric liquid crystal layer was changed to 0.01 parts by mass and the addition amount of the surfactant F2 was changed to 0.02 parts by mass.

Example 5

A decorative sheet 5 was prepared using the same method as that of Example 1, except that the following undercoat layer coating solution 5 was used instead of the undercoat layer coating solution 1.

(Undercoat Layer Coating Solution 5)

BLEMMER GLM (manufactured by NOF Corporation) having the following structure: 100 parts by mass IRGACURE 907 (manufactured by Ciba-Geigy): 3 parts by mass KAYACURE DETX (manufactured by Nippon Kayaku Co., Ltd.): 1 part by mass Surfactant F1 having the above-described structure: 0.01 parts by mass Methyl isobutyl ketone: 243 parts by mass

BLEMMER GLM

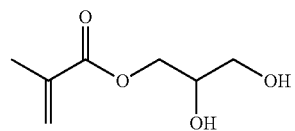

Example 6

A decorative sheet 6 was prepared using the same method as that of Example 1, except that the following transparent support 6 with an undercoat layer was used instead of the transparent support 1 with the undercoat layer.

(Preparation of Transparent Support 6 with Undercoat Layer)

An undercoat layer coating solution 6 having the following composition was applied to a surface of the transparent support 1 using a #16 wire bar coater. Next, the obtained support 1 was dried at 60° C. for 60 seconds and was dried at 90° C. for 150 seconds. Next, the coating surface side was rubbed by being rotated using a rubbing roll in a direction perpendicular to the transport direction at a clearance of 1.0 mm and at 1000 rev/min. As a result, a transparent support 6 with the undercoat layer was prepared.

(Undercoat Layer Coating Solution 6)

The following modified polyvinyl alcohol: 10 parts by mass

Water: 370 parts by mass

Methanol: 120 parts by mass

Glutaraldehyde (crosslinking agent): 0.5 parts by mass $$-\!\!\!\left(CH_2-CH\right)_{\!86.3}\!\!\left(CH_2-CH\right)_{\!12}\!\!\left(CH_2-CH\right)_{\!1.7}\!\!\begin{array}{c}CH_3\\|\\OH\end{array}\begin{array}{c}\\|\\OCOCH_3\end{array}\begin{array}{c}\\|\\OCONHCH_2CH_2OCOC=\!\!=\!CH_2\end{array}$$

Example 7

(Preparation of Cholesteric Liquid Crystal Layer 7)

The following components were stirred in a container held at 25° C. to prepare a coating solution Ch7 for a cholesteric liquid crystal layer.

(Coating Solution Ch7 for Cholesteric Liquid Crystal Layer)

Methyl ethyl ketone: 198.2 parts by mass

Mixture L1 of the above-described rod-like liquid crystal compounds: 100 parts by mass IRGACURE 907 (manufactured by Ciba-Geigy): 0.0375 parts by mass KAYACURE DETX (manufactured by Nippon Kayaku Co., Ltd.): 0.0125 part by mass Chiral agent B having the following structure: 6.06 parts by mass Surfactant F1 having the above-described structure: 0.03 parts by mass Surfactant F2 having the above-described structure: 0.07 parts by mass Chiral Agent B The coating solution Ch7 for a cholesteric liquid crystal layer was applied to a surface of the transparent support 1 with the undercoat layer using a #16 wire bar coater. Next, the obtained transparent support 1 was dried at 105° C. for 60 seconds and was irradiated with ultraviolet light using an ultraviolet irradiation device at 130 mW/cm$^2$ and 500 mJ/cm$^2$ at 100° C. at an oxygen concentration of 200 ppm. As a result, a circularly polarized light reflecting layer 7 was prepared.

In the circularly polarized light reflecting layer 7, the helical pitch changed in the thickness direction, and the reflectivity in a wavelength range of 450 nm to 650 nm was at least 40% or higher. In addition, the coating solution Ch7 for a cholesteric liquid crystal layer is a material for forming a reflecting layer that reflects right circularly polarized light. That is, the coating solution Ch7 for a cholesteric liquid crystal layer is a material for reflecting right circularly polarized light in a wavelength range 450 nm to 650 nm.

(Preparation of Decorative Sheet 7)

The laminate 1 was bonded to the support side of the prepared circularly polarized light reflecting layer 7 using a pressure sensitive adhesive SK2057 (manufactured by Soken Chemical & Engineering Co., Ltd.). As a result, a decorative sheet 7 was prepared.

Comparative Example 1

The circularly polarized light reflecting layer 1 prepared using the same method as that of Example 1 was used.

Comparative Example 2

The circularly polarized light reflecting layer 1 prepared using the same method as that of Example 1 was used. Further, the optically-anisotropic layer side of the λ/4 plate was bonded to the support side of the cholesteric liquid crystal layer R1 constituting the circularly polarized light reflecting layer 1 using a pressure sensitive adhesive SK2057 (manufactured by Soken Chemical & Engineering Co., Ltd.). As a result, a decorative sheet according to Comparative Example 2 was prepared.

Comparative Example 3

A laminate 2 was prepared using the same method as that of the laminate 1 according to Example 1, except that the λ/4 plate and Z-TAC (manufactured by Fuji Film Co., Ltd.) were prepared and were bonded to each other with the polarizer interposed therebetween such that the support side was the polarizer side. The laminate 2 was used as a decorative sheet according to Comparative Example 3.

Comparative Example 4

The circularly polarized light reflecting layer 1 prepared using the same method as that of Example 1 was used. Further, the λ/4 plate side of the laminate 2 was bonded to the support side of the cholesteric liquid crystal layer R1 constituting the circularly polarized light reflecting layer 1 using a pressure sensitive adhesive SK2057 (manufactured by Soken Chemical & Engineering Co., Ltd.). As a result, a decorative sheet according to Comparative Example 4 was prepared.

Comparative Example 5

A decorative sheet according to Comparative Example 5 was prepared using the same method as that of Example 1, except that the thickness of the cholesteric liquid crystal layer G1 was changed.

<Evaluation>

The results of performing measurement and evaluation using each of the decorative sheets prepared in Examples and Comparative Examples are shown in Table 1 below.

(Measurement of Wavy Structure of Cholesteric Liquid Crystal Layer)

In a cross-section SEM image, coordinates of all the stripe patterns positioned within a thickness of 1 μm from opposite surfaces of the cholesteric liquid crystal layer were obtained, and an inclination (inclination angle) of each of the points in a range of 55 μm was calculated per 0.12 μm in a direction parallel to the film.

The inclination (inclination angle) of each of the points was calculated from the coordinate data within ±0.3 μm (corresponding to 0.6 μm) around each of the points. In a case where at least one region M in which the absolute values of the inclinations (inclination angles) were 5° or more was present and a peak or valley having an inclination angle of 0° was able to be specified at two points most adjacent to each other with the region M interposed therebetween, this case is represented by "Wavy". In a case where a structure (wavy structure) determined to be "Wavy" was not observed, this case is represented by "Not Wavy".

In Table 1 below, "Wavy" represents that the wavy structure was present in all the cholesteric liquid crystal layers included in the circularly polarized light reflecting layer. In addition, "Not Wavy" represents that the wavy structure was not present in all the cholesteric liquid crystal layers included in the circularly polarized light reflecting layer.

(Evaluation of Visibility of Camera)

As a sensor, iPhone (registered trade name) 7 (Apple) was prepared and was used as a sensor 1. A box with one open surface and five light-shielded surfaces was prepared, and the sensor 1 was disposed on the open surface of the light-shielded box such that the camera faced outside. Further, the surface of the box was covered with each of the decorative sheets according to Examples and Comparative Examples, and the visibility of the sensor was evaluated from the following viewpoints in case of being seen on the front side, at an inclination of 25°, and at an inclination of 50° from the outside of sensor 1. The decorative sheet was disposed such that the circularly polarized light reflecting layer side thereof was on the visible side.

A: the camera was inconspicuous in case of being seen on the front side, at an inclination of 25°, and at an inclination of 50°

B: the camera was inconspicuous on the front surface but was conspicuous at an inclination of 25° and at an inclination of 50° in a case where the position of the camera was recognized C: the camera was inconspicuous on the front surface and an inclination of 25° but was conspicuous at an inclination of 50° in a case where the position of the camera was recognized D: the camera was conspicuous in case of being seen on the front side, at an inclination of 25°, and at an inclination of 50°.

(Evaluation of Face Recognition of Camera)

With the same evaluation form as that of the evaluation of the visibility of the camera, the degree to which the camera of the sensor 1 was able to recognize a face was evaluated based on the following viewpoints.

A: the face was able to be recognized in any imaging region of the camera

B: there was a position in which the camera was not able to recognize the face.

(Evaluation of Tint of Decorative Sheet)

With the same evaluation form as that of the evaluation of the visibility of the camera, the tint of the decorative sheet was evaluated in case of being seen from the front side up to an inclination angle of 50° in an oblique direction. Only in a case where a tint change was recognized, the recognized tint was shown.

In Table 1, "Reflecting Layer 1" corresponds to the circularly polarized light reflecting layer 1.

"Reflecting Layer 2" corresponds to an aspect where the thickness of the cholesteric liquid crystal layer in the circularly polarized light reflecting layer 1 was changed.

"Reflecting Layer 3" corresponds to an aspect where the cholesteric liquid crystal layer IR3 was further laminated on the circularly polarized light reflecting layer 1.

"Reflecting Layer 4" corresponds to an aspect where the amount of the surfactant used in the coating solution for a cholesteric liquid crystal layer for forming the circularly polarized light reflecting layer 1 was changed.

"Reflecting Layer 5" and "Reflecting Layer 6" corresponds to an aspect where the kind of the undercoat layer used for forming the circularly polarized light reflecting layer 1 was changed.

"Reflecting Layer 7" corresponds to the circularly polarized light reflecting layer 7.

"Reflecting Layer 8" corresponds to an aspect where the thickness of the cholesteric liquid crystal layer G1 in the circularly polarized light reflecting layer 1 was changed.

TABLE 1

|  | Example 1 | Example 2 | Example 3 | Example 4 | Example 5 | Example 6 | Example 7 |
|---|---|---|---|---|---|---|---|
| Circularly Polarized Light Reflecting Layer | Reflecting Layer 1 | Reflecting Layer 2 | Reflecting Layer 3 | Reflecting Layer 4 | Reflecting Layer 5 | Reflecting Layer 6 | Reflecting Layer 7 |
| λ/4 Plate A | Provided | Provided | Provided | Provided | Provided | Provided | Provided |
| Polarizer | Provided | Provided | Provided | Provided | Provided | Provided | Provided |
| λ/4 Plate B | Provided | Provided | Provided | Provided | Provided | Provided | Provided |
| Integral Reflectivity@450 nm | 49 | 30 | 49 | 49 | 49 | 49 | 45 |
| Integral Reflectivity@550 nm | 49 | 30 | 49 | 49 | 49 | 49 | 43 |
| Integral Reflectivity@630 nm | 49 | 30 | 49 | 49 | 49 | 49 | 42 |
| Integral Reflectivity@750 nm | — | — | 45 | — | — | — | — |
| Specular Reflectivity @450 nm | 14 | 10 | 14 | 14 | 25 | 49 | 14 |
| Specular Reflectivity @550 nm | 14 | 10 | 14 | 14 | 25 | 49 | 14 |
| Specular Reflectivity @630 nm | 14 | 10 | 14 | 14 | 25 | 49 | 14 |
| Specular Reflectivity @750 nm | — | — | 14 | — | — | — | — |
| R[45, 35](450)/R[45, 20](450) | 6.0 | 6.0 | 6.0 | 2.0 | 14.0 | — | 6.0 |
| R[45, 35](550)/R[45, 20](550) | 5.8 | 5.8 | 5.8 | 2.0 | 14.2 | — | 5.8 |
| R[45, 35](630)/R[45, 20](630) | 6.0 | 6.0 | 6.0 | 2.0 | 13.5 | — | 6.0 |
| Wavy Structure | Wavy | Wavy | Wavy | Wavy | Wavy | Not Wavy | Wavy |
| Visibility of Camera | A | A | A | A | B | C | A |
| Face Recognition of Camera | A | A | A | A | A | A | A |
| Tint of Decorative Sheet | Cyan | Cyan | None | None | Cyan | Cyan | Cyan |

TABLE 1-continued

|  | Comparative Example 1 | Comparative Example 2 | Comparative Example 3 | Comparative Example 4 | Comparative Example 5 |
|---|---|---|---|---|---|
| Circularly Polarized Light Reflecting Layer | Reflecting Layer 1 | Reflecting Layer 1 | — | Reflecting Layer 1 | Reflecting Layer 8 |
| λ/4 Plate A | — | Provided | — | Provided | Provided |
| Polarizer | — | — | Provided | Provided | Provided |
| λ/4 Plate B | — | — | Provided | — | Provided |
| Integral Reflectivity@450 nm | 49 | 49 | — | 49 | 49 |
| Integral Reflectivity@550 nm | 49 | 49 | — | 49 | 25 |
| Integral Reflectivity@630 nm | 49 | 49 | — | 49 | 49 |
| Integral Reflectivity@750 nm | — | — | — | — | — |
| Specular Reflectivity @450 nm | 14 | 14 | — | 14 | 14 |
| Specular Reflectivity @550 nm | 14 | 14 | — | 14 | 9 |
| Specular Reflectivity @630 nm | 14 | 14 | — | 14 | 14 |
| Specular Reflectivity @750 nm | — | — | — | — | — |
| R[45, 35](450)/R[45, 20](450) | 6.0 | 6.0 | — | 6.0 | 6.0 |
| R[45, 35](550)/R[45, 20](550) | 5.8 | 5.8 | — | 5.8 | 5.8 |
| R[45, 35](630)/R[45, 20](630) | 6.0 | 6.0 | — | 6.0 | 6.0 |
| Wavy Structure | Wavy | Wavy | — | Wavy | Wavy |
| Visibility of Camera | D | D | D | D | D |
| Face Recognition of Camera | A | A | A | A | A |
| Tint of Decorative Sheet | — | — | — | — | — |

As shown in Table 1, in a case where the decorative sheet according to the embodiment of the present invention was used, the desired effects were obtained.

It was found from a comparison between Example 6 and other Examples that, in a case where S-R(630), S-R(550), and S-R(450) are 30% or lower, the effects are further improved.

In addition, it was found from a comparison between Example 5 and Other Examples that, in a case where the circularly polarized light reflecting layer satisfies Expressions (A1) to (C1), the effects are further improved.

Further, it was found that, in a case where the circularly polarized light reflecting layer satisfies Expressions (A2) to (C2) or in a case where I-R(750) of the circularly polarized light reflecting layer is 30% or higher, the tint of the decorative sheet can be suppressed.

EXPLANATION OF REFERENCES

10: decorative sheet
12: circularly polarized light reflecting layer
14: λ/4 plate A
16: linear polarizer
18: λ/4 plate B
20: first cholesteric liquid crystal layer
22: second cholesteric liquid crystal layer
24: third cholesteric liquid crystal layer

What is claimed is:

1. A decorative sheet comprising a circularly polarized light reflecting layer, a λ/4 plate A, a linear polarizer, and a λ/4 plate B in this order,
   wherein the circularly polarized light reflecting layer includes a plurality of cholesteric liquid crystal layers having wavelength selective reflecting properties,
   all the plurality of cholesteric liquid crystal layers reflect right circularly polarized light or all the plurality of cholesteric liquid crystal layers reflect left circularly polarized light,
   in a case where an integral reflectivity at a wavelength λ nm is represented by I-R(λ),
   I-R(630), I-R(550), and I-R(450) of the circularly polarized light reflecting layer are 30% or higher,
   an angle between a slow axis of the λ/4 plate A and an absorption axis of the linear polarizer and an angle between a slow axis of the λ/4 plate B and the absorption axis of the linear polarizer are 45°±10°, respectively, and
   in a case where the circularly polarized light reflecting layer reflects right circularly polarized light and the linear polarizer is observed from the λ/4 plate A side, the linear polarizer and the λ/4 plate A are arranged such that the absorption axis of the linear polarizer is shifted counterclockwise by 45°±10° from the slow axis of the λ/4 plate A, while in a case where the circularly polarized light reflecting layer reflects left circularly polarized light and the linear polarizer is observed from the λ/4 plate A side, the linear polarizer and the λ/4 plate A are arranged such that the absorption axis of the linear polarizer is shifted clockwise by 45°±10° from the slow axis of the λ/4 plate A.

2. The decorative sheet according to claim 1,
   wherein in a case where a specular reflectivity at a wavelength λ nm is represented by S-R(λ),
   S-R(630), S-R(550), and S-R(450) of the circularly polarized light reflecting layer are 30% or lower.

3. The decorative sheet according to claim 2,
   wherein the circularly polarized light reflecting layer satisfies Expressions (A1) to (C1), $$R[45,35](630)/R[45,20](630) \leq 10.0, \quad \text{Expression (A1)}$$

$$R[45,35](550)/R[45,20](550) \leq 10.0, \text{ and} \quad \text{Expression (B1)}$$

$$R[45,35](450)/R[45,20](450) \leq 10.0, \text{ and} \quad \text{Expression (C1)}$$

where $R[45,35](\lambda)$ represents a reflectivity at a wavelength λ with respect to incidence light with a polar angle of 45° to the circularly polarized light reflecting layer, the reflectivity being measured at a light receiving angle having a polar angle of 35° with respect to an azimuthal angle shifted by 180° from an azimuthal angle of the incidence light, and where $R[45,20](\lambda)$ represents a reflectivity at a wavelength λ with respect to incidence light with a polar angle of 45° to the circularly polarized light reflecting layer, the reflectivity being measured at a light receiving angle having a polar angle of 20° with respect to an azimuthal angle shifted by 180° from an azimuthal angle of the incidence light.

4. The decorative sheet according to claim 2,
wherein the circularly polarized light reflecting layer includes a plurality of cholesteric liquid crystal layers having different selective reflection wavelengths, and
the selective reflection wavelengths of the plurality of cholesteric liquid crystal layers decrease in order from the linear polarizer side.

5. The decorative sheet according to claim 2,
wherein in a case where an integral reflectivity at a wavelength λ nm is represented by I-R(λ),
I-R(750) of the circularly polarized light reflecting layer is 30% or higher.

6. An optical device comprising:
the decorative sheet according to claim 2; and
an element using light transmitted through the decorative sheet,
wherein the decorative sheet is disposed such that the circularly polarized light reflecting layer is positioned on a visible side.

7. The decorative sheet according to claim 1,
wherein the circularly polarized light reflecting layer satisfies Expressions (A1) to (C1), $$R[45,35](630)/R[45,20](630) \leq 10.0, \qquad \text{Expression (A1)}$$

$$R[45,35](550)/R[45,20](550) \leq 10.0, \text{ and} \qquad \text{Expression (B1)}$$

$$R[45,35](450)/R[45,20](450) \leq 10.0, \text{ and} \qquad \text{Expression (C1)}$$

where $R[45,35](\lambda)$ represents a reflectivity at a wavelength λ with respect to incidence light with a polar angle of 45° to the circularly polarized light reflecting layer, the reflectivity being measured at a light receiving angle having a polar angle of 35° with respect to an azimuthal angle shifted by 180° from an azimuthal angle of the incidence light, and
where $R[45,20](\lambda)$ represents a reflectivity at a wavelength λ with respect to incidence light with a polar angle of 45° to the circularly polarized light reflecting layer, the reflectivity being measured at a light receiving angle having a polar angle of 20° with respect to an azimuthal angle shifted by 180° from an azimuthal angle of the incidence light.

8. The decorative sheet according to claim 7,
wherein the circularly polarized light reflecting layer satisfies Expressions (A2) to (C2), $$R[45,35](630)/R[45,20](630) \leq 4.0, \qquad \text{Expression (A2)}$$

$$R[45,35](550)/R[45,20](550) \leq 4.0, \text{ and} \qquad \text{Expression (B2)}$$

$$R[45,35](450)/R[45,20](450) \leq 4.0. \qquad \text{Expression (C2)}$$

9. The decorative sheet according to claim 7,
wherein the circularly polarized light reflecting layer includes a plurality of cholesteric liquid crystal layers having different selective reflection wavelengths, and
the selective reflection wavelengths of the plurality of cholesteric liquid crystal layers decrease in order from the linear polarizer side.

10. The decorative sheet according to claim 7,
wherein in a case where an integral reflectivity at a wavelength λ nm is represented by I-R(λ),
I-R(750) of the circularly polarized light reflecting layer is 30% or higher.

11. An optical device comprising:
the decorative sheet according to claim 7; and
an element using light transmitted through the decorative sheet,
wherein the decorative sheet is disposed such that the circularly polarized light reflecting layer is positioned on a visible side.

12. The decorative sheet according to claim 1,
wherein the circularly polarized light reflecting layer includes a plurality of cholesteric liquid crystal layers having different selective reflection wavelengths, and
the selective reflection wavelengths of the plurality of cholesteric liquid crystal layers decrease in order from the linear polarizer side.

13. The decorative sheet according to claim 1,
wherein in a case where an integral reflectivity at a wavelength λ nm is represented by I-R(λ),
I-R(750) of the circularly polarized light reflecting layer is 30% or higher.

14. An optical device comprising:
the decorative sheet according to claim 1; and
an element using light transmitted through the decorative sheet,
wherein the decorative sheet is disposed such that the circularly polarized light reflecting layer is positioned on a visible side.

15. The optical device according to claim 14,
wherein the decorative sheet according to claim 1 is disposed on a surface of the element using light transmitted through the decorative sheet.

16. The optical device according to claim 14,
wherein the element using light transmitted through the decorative sheet is an image pickup element.

17. An image display device comprising:
the decorative sheet according to claim 1; and
an image display element.

* * * * *